Oct. 16, 1962 H. W. TREVASKIS 3,058,721
DEVICE FOR TRANSMITTING OR RETAINING VACUUM
OR NEGATIVE PRESSURE CONDITIONS
Filed Nov. 17, 1959

INVENTOR.
Henry William Trevaskis
by Benj. T. Paulo
his attorney

United States Patent Office 3,058,721
Patented Oct. 16, 1962

3,058,721
DEVICE FOR TRANSMITTING OR RETAINING VACUUM OR NEGATIVE PRESSURE CONDITIONS
Henry William Trevaskis, Point Pleasant, Blackdown, near Leamington Spa, England, assignor to Dunlop Rubber Company Limited, a company of Great Britain
Filed Nov. 17, 1959, Ser. No. 853,627
Claims priority, application Great Britain Nov. 17, 1958
6 Claims. (Cl. 254—93)

This invention relates to a device for transmitting or retaining vacuum or negative pressure conditions, that is to say pressure lower than the external pressure surrounding it. Examples of such devices are connectors for joining pipes to objects to which vacuum or negative pressure conditions are to be applied, or vacuum or negative pressure operated jacks comprising a collapsible member such as a bellows, the ends of which can be connected to objects required to be moved relatively towards each other, the interior of the member then being submitted to vacuum or negative pressure so as to cause it to collapse and effect the desired movement.

According to the present invention a device for transmitting or retaining vacuum or negative pressure conditions comprises a tubular element having an enlarged end part with an opening of area greater than the cross-sectional area, parallel to the opening, of the element adjacent the end part, whereby the opening can be applied to a surface which closes it and, when the device is submitted to vacuum or negative pressure will adhere thereto due to the external pressure on the enlarged end part.

The tubular element may simply be a connection such as a pipe for supplying the vacuum or negative pressure or may itself be an operative part such as a bellows to be collapsed when the vacuum or negative pressure is applied.

Among the uses of the invention is the placing of bead wires on a tyre carcass in the construction of a pneumatic tyre. In the process of building a tyre by commonly used methods, a tyre carcass is built on a former by laying thereon plies of bias-cut fabric which cover the cylindrical surface of the former and extend radially inwardly over the ends of the former. The margin of the end surfaces of the former may be contoured to approximate the shape of the finished tyre adjacent to the beads. Radially within this margin of each end of the former and generally axially inward of the ends is a flat surface in a plane at a right angle, or normal, to the axis of the former and centrally or axially of the former a supporting shaft at the axis of the cylindrical surface of the former. After the plies of the carcass have been formed on the former and the ends of the plies turned inwardly onto the ends of the former, a circular bead wire is placed on the inturned plies and the portion of the plies extending inwardly of the bead wires are turned outwardly about the bead wires. The bead wires must be positioned on the end surfaces with precision so that they are centered on the axis of the former—otherwise the tyre would be off-center and therefore defective. The plies of the carcass are rubberized with an unvulcanized rubber composition and therefore tacky and the bead wires are also wrapped in a chafer strip of similarly rubberized fabric. Upon being pressed against the plies on the ends of the former they adhere firmly and are not displaced by subsequent tyre finishing operations. To permit such tyre finishing or forming operations the bead ring placing means of the present invention is removable after the rings are set and adhered to the carcass.

To this end an embodiment of my invention is provided with a tubular supporting part which is slidable onto the supporting shaft of the former, this tubular element being formed of telescoping parts which enable it to be contracted axially. This tubular element carries at each end a disc which, in turn, carries a ring of flexible material concentric with the axis of the former so that one disc may seal fluid-tightly against an end surface of the former and the other against a bead holding element. Encircling the tubular supporting part and connecting the discs to form a fluid tight enclosure is a pair of tubular enclosing elements that are contractable axially when the enclosed space is vacuumized. This enclosure is preferably annular and formed of an inner bellows and an outer encircling bellows reinforced to prevent radially inward collapse but to permit axial contraction. To place the bead ring on the ply portions on the end of the former, it is therefore necessary only to mount the bead ring support in position on one end disc, slide the assembly onto the shaft of the former until the other disc seals against the former, vacuumize the spaces between the bellows and between the end disc and former and the other end disc and the bead holding element. When the bead ring has been adhered to the plies on the end of the former, the mounting apparatus may be released by breaking the vacuum and sliding the apparatus from the shaft of the former. The apparatus may be similarly used to bring a shaping tool against the end of the former.

Embodiments of the invention are illustrated by the accompanying drawings in which FIGURE 1 is a diagrammatic cross-section of a pipe connector, FIGURE 2 is a diagrammatic cross-section of a lifting jack, FIGURE 3 is a radial longitudinal section of the upper half of a double-ended jack.

Referring first to FIGURE 1 the connector is designed to be used for connecting a vacuum pipe to a port 1 in a flat surface 2. The connector comprises a short cylindrical tubular element 3 having at one end a ferrule 4 to which the pipe is to be secured. At the other end of the tubular element is an enlarged annular end part 5 having a surrounding rib 6 on its face remote from the element 3, the rib having in its annular face a circular groove in which is seated a circular sealing washer 7 of circular cross-section, commonly known as an O ring. In use, when it is desired to apply vacuum or negative pressure to the port 1, the connector, with the supply pipe secured to its ferrule 4, is simply applied as shown to the surface 2 so as to enclose the port 1. Vacuum or negative pressure is supplied to the pipe and thus to the interior of the connector whereupon the external atmospheric pressure acting on the outer annular surface of the enlarged part 5, as indicated by the arrow P will urge the connector towards the surface 2, entry of air being prevented by means of the O ring 7. The vacuum or negative pressure will thus be applied to the port 1.

FIGURE 2 shows a device for retaining vacuum or negative pressure in the form of a lifting jack in which the vacuum or negative pressure is utilised not only to retain the device in operative position but also to cause desired movement of an article to which it is applied. The jack comprises a tubular bellows 8 closed at one end except for a ferrule to which a vacuum or negative pressure supply pipe 9 is connected. The bellows is suspended by its closed end as shown. At its other end the bellows is connected to an annular end part 10 of greater cross-section than the bellows having a surrounding annular flange 11 in the end of which is mounted an O ring seal 12.

The jack is designed for lifting objects having smooth flat upper surfaces with which the O ring 12 can readily make sealing engagement. One example of such an article is a sheet of glass. In use the jack is simply placed on the said smooth upper surface of the article, shown in the drawings as a flat sheet 13, the bellows 8 being extended by virtue of their construction and/or of the weight of the end part 10. Vacuum or negative pressure is then supplied to the pipe 9 whereupon the external atmospheric pressure acting on the outer annular surface of the end part 10, as indicated by the arrow P, urges this part towards the sheet 13, the O ring 12 being thus compressed into sealing engagement with the sheet. At the same time the external atmospheric pressure acting on the underside of the sheet and on the closed end of the bellows tends to collapse the bellows so that the sheet is lifted.

FIGURE 3 shows a somewhat similar application of the invention in a device for drawing together two objects having confronting smooth flat surfaces. The particular embodiment illustrated is designed for use in a tyre building machine for applying shaping devices or rings for carrying components of a tyre carcass to the sides of a tyre building former. For this purpose the former has a flat circular surface at each end of its centre part and each of the shaping devices or rings has a centre part with a similar flat inner surface. Each of the shaping devices or rings has in its centre part a port through which vacuum or negative pressure can be applied to the device.

The device comprises an annular collapsible bellows having an inner cylindrical corrugated wall 14 and an outer cylindrical corrugated wall 15. The ends of these walls are secured to a pair of annular end members 16, 17 having axially extending tubes 18, 19 respectively at their inner peripheries which are slidable axially one within the other so that the end members can move axially towards or away from each other whilst being retained in coaxial alignment. A number of limiting bolts 20 pass through both end members to limit their movement apart and a compression spring 21 surrounds each bolts and abuts against the end members to urge them towards this outer limiting position, in which the bellows is fully extended, as shown in the drawing.

Each of the end parts, 16, 17 has adjacent its inner periphery a groove receiving an annular sealing washer 22 of tapered cross-section and of diameter approximately equal to the diameter of the inner wall 14 of the bellows. The outer periphery of each end part is of greater diameter than the outer wall 15 of the bellows and has a similar groove in which is mounted a similar sealing ring 23 of diameter greater than the wall 15. The effective cross-sectional area of the annular end member as defined between the sealing rings 22, 23 is thus greater than the cross-section of the bellows as defined between the walls 14, 15. The end members have apertures 25 between the bolts 20 by which air can be evacuated from the interior of the bellows.

In use the device is slidably mounted, by means of the tube 19, on the shaft of the tyre building former so that the sealing rings 22, 23 of the end member 17 contact an end surface of the former. The shaping device or ring to be applied to the side of the former is then slidably mounted on the shaft so that the flat surface of its centre part engages the sealing rings 22, 23 of the other end member 16. Vacuum or negative pressure is then applied to the port in this centre part, for example by means of a pipe connector as described above with reference to FIGURE 1, so as to withdraw air from the interior of the space enclosed by the end members and the bellows. On the reduction of internal pressure thus produced, the external atmospheric pressure acting on the projecting parts of the end members 16, 17, as indicated by the arrows P urges these end portions towards the centre parts of the former and shaping device or ring respectively, in the same manner as described with reference to the previous embodiments, so that sealing relation is provided by the rings 22, 23. The external pressure acting on the outer surface of the shaping device or ring and on the opposite side of the former then tends to collapse the bellows, whereupon the end member 16 moves towards the end member 17, carrying with it the shaping device or ring which is thus applied to the side of the former. The force with which the shaping device or ring is applied depends upon the cross-sectional area of the bellows and the degree of depression produced within it.

A number of filler blocks 24 is mounted inside the bellows, to reduce its internal volume and thus reduce the amount of air required to be withdrawn in order to establish desired vacuum or negative pressure within it.

By use of this last embodiment tyre building operations can be effected quickly and easily, and the bellows as well as the various members can readily be removed from the shaft to provide clearance for performing other operations when desired.

Although the invention has been particularly described with reference to examples of application in which the collapsible member is a bellows, it will be understood that other forms of collapsible member, such as piston and cylinder arrangements, could be used if desired.

Having now described my invention, what I claim is:

1. Apparatus for drawing together two objects having confronting surfaces which comprises a pair of axially slidable telescoping tubes, a pair of end members one secured to the free end of one of said telescoping tubes and the other being secured to the free end of the other of said telescoping tubes, a pair of concentric sealing rings mounted on said end members and encircling the axis of said telescoping tubes to form on each end member an annular suction space, a pair of bellows encircling said telescoping tubes and sealed to said end members to enclose an annular space collapsible axially and means to reduce the pressure within said annular space below atmospheric pressure to draw said end members toward each other.

2. The apparatus of claim 1 in which said end members are annular and extend radially outwardly from said telescoping tubes.

3. The apparatus of claim 1 having filler blocks partially filling said annular space.

4. The apparatus of claim 1 having a coiled spring between said end members to move said end members away from each other when the pressure within said space is restored to atmospheric pressure.

5. Apparatus for drawing together two objects having confronting surfaces which comprises a pair of end members each having a pair of concentric resilient suction rings on its axially outer area defining an annular suction area, a guiding element extending between said end plates to guide them in axial movement toward and from each other and an annular enclosure concentric to an axis between, and secured fluid tightly to said end members, said enclosure being axially collapsible under subatmospheric pressure to draw said end members toward each other.

6. Apparatus for drawing together two objects having confronting surfaces which comprises a pair of axially slidable telescoping tubes, a pair of end members one secured to the free end of one of said telescoping tubes and the other being secured to the free end of the other of said telescoping tubes, sealing means attached to at least one to the axially outermost end of each end member to define a suction space, each end member having an enlarged portion, the effective cross section of which, when acted upon by atmospheric pressure and upon the establishment of suction in the suction space, operates to seal said member upon one of said confronting surfaces.

References Cited in the file of this patent

UNITED STATES PATENTS

| | | |
|---|---|---|
| 1,294,103 | Hitchcock | Feb. 11, 1919 |
| 1,921,579 | Otto | Aug. 8, 1933 |
| 2,557,260 | Clark | June 19, 1951 |
| 2,920,916 | Pagdin | Jan. 12, 1960 |